United States Patent Office 3,324,569
Patented June 13, 1967

3,324,569
GRAIN DRIERS
Philip H. Collier, St. Thomas' Priory Farm,
Stafford, Staffordshire, England
Filed Sept. 8, 1964, Ser. No. 394,807
Claims priority, application Great Britain, Sept. 9, 1963,
35,433/63
5 Claims. (Cl. 34—102)

This invention relates to driers for grain and other granular material hereinafter referred to merely as "grain" and an object of the present invention is to provide an improved drier of economical construction and which provides an even drying of the grain.

According to the invention, a drier for grain as defined comprising a bin having a lower interior part downwardly inclined to form a plenum chamber therebelow which inclined part is provided with louvres which are inwardly and downwardly directed to allow passage of heated air from the plenum chamber to and through the grain passing over the said inclined part, means for elevating the grain from the bottom of the inclined part and distributing it on the surface of the grain in the bin, discharging means associated with the elevating means whereby dried grain may be discharged from the bin, and a skirt-like member mounted within the bin so that its lower extremity in conjunction with the surface of the said inclined part defines a path for the layer of grain descending to the bottom of the said inclined part, characterised in that the space under the skirt-like member communicates with an air-duct leading to atmosphere.

Conveniently, the bin is cylindrical and the inclined part is of inverted conical form so that the apex comes to the lower centre of the bin from which the grain may be elevated by a vertical conveyor such as an auger.

In an alternative form the bin may be rectangular and the inclined part is formed of two main surfaces which form a V-trough along the bottom of the bin. In the trough there is a horizontal conveyor which delivers the grain to a vertical conveyor for distribution over the surface of the grain in the bin.

Figure 1:
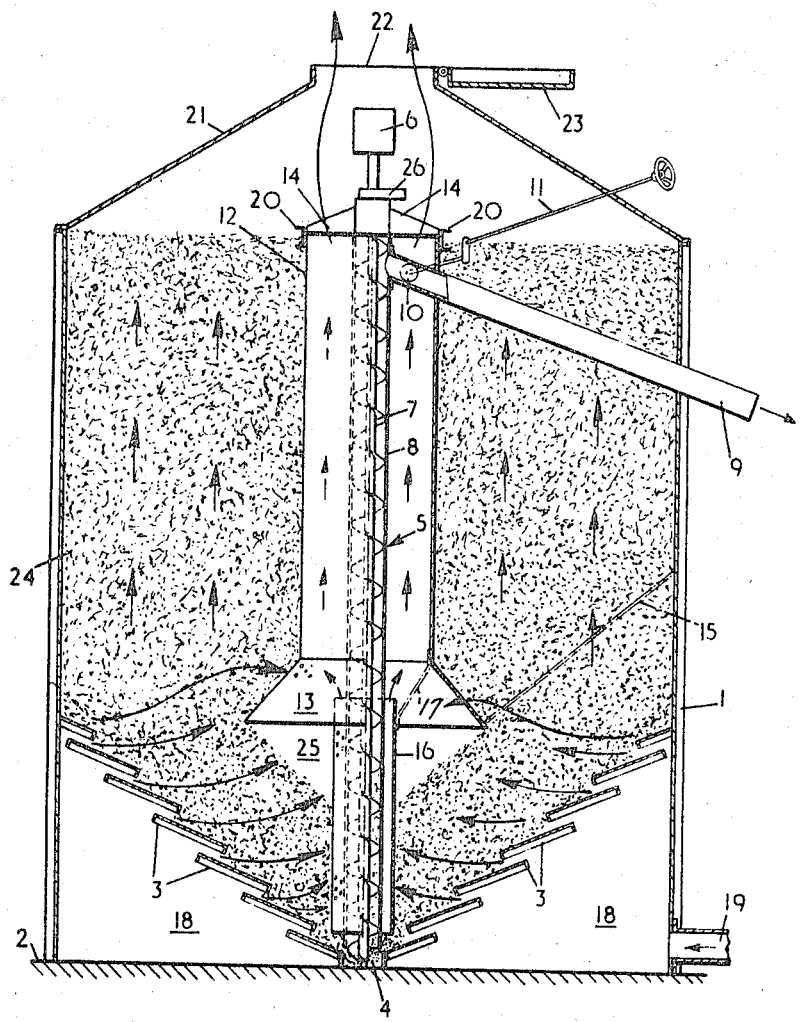
Figure 2:
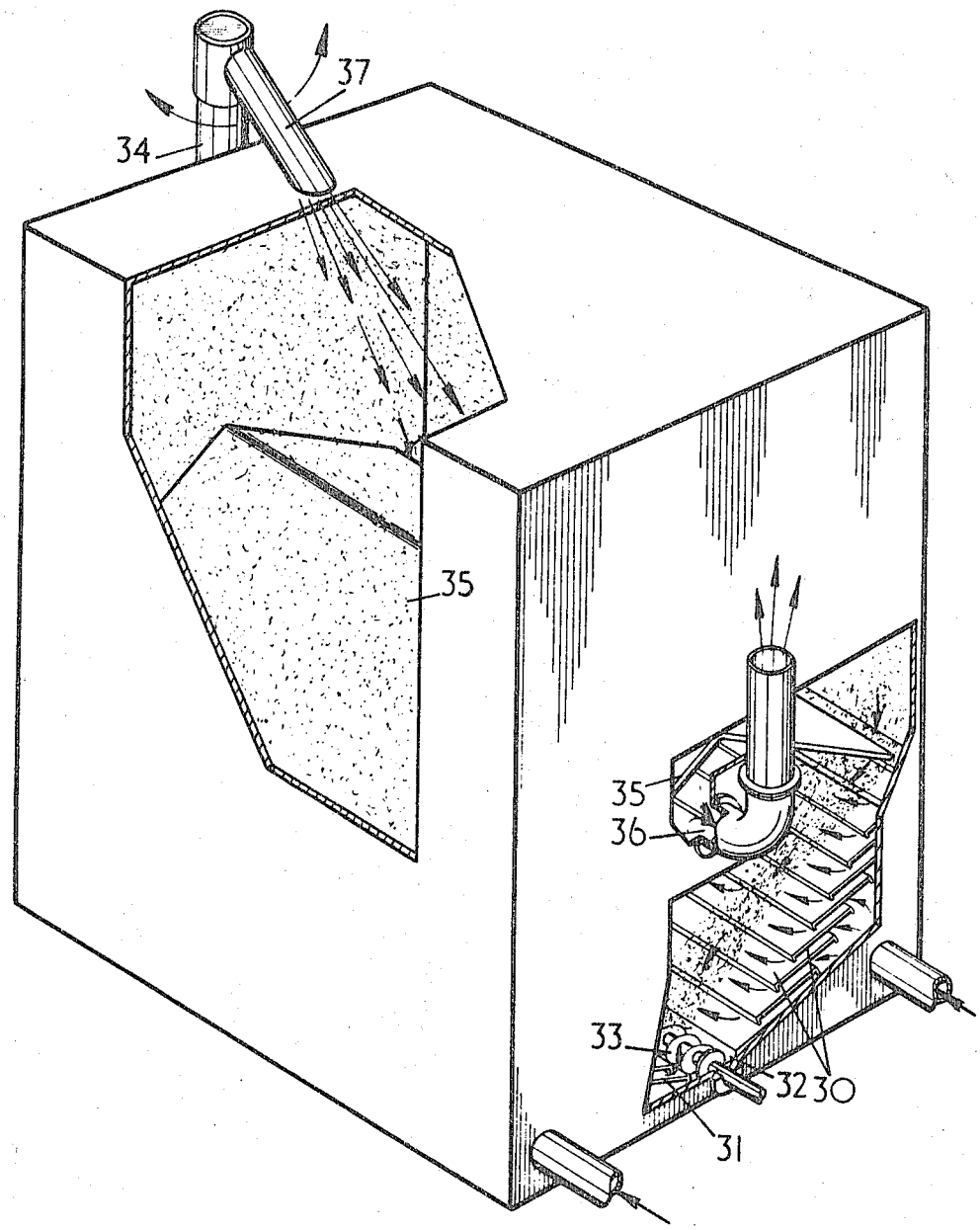

The invention will now be described, by way of example, with reference to the accompanying drawings of which FIG. 1 is a sectional view of one form of drier embodying the invention, and FIG. 2 is a cut-away perspective view of an alternative form of drier.

The grain drier shown in FIG. 1 comprises a substantially cylindrical bin wall 1 which sits on a prepared base 2. In the lower portion of the bin there are arranged a series of louvre elements 3 supported on a framework not shown for the sake of clarity, which louvre elements form an inverted cone the apex of which leads to a small well 4 at the lower end of an auger 5 driven by an electric motor 6. The auger 5 comprises the usual screw 7 and tubular casing 8, which latter has a side branch 9 with a controlling valve 10 operated by means of a control rod 11. Surrounding the middle and upper portions of the auger 5 is a tubular duct 12 which terminates at its lower end in an outwardly-flared frustoconical member 13 which is perforated. Duct 12 is spaced at the top from auger casing 8 by webs 14 and both are supported from cross-members 20 extending across the bin. At the lower end the duct assembly is supported by stays 15 (only one of which is shown) to the member 13. The lower part of the auger 5 is surrounded by a perforated cylindrical tube 16 supported from stays 17 of which only one is shown.

The lower part of the bin wall 1, the base 2 and the louvred cone 3 together form a plenum chamber 18 into which heated air at a suitable pressure is passed via inlet duct 19. The bin is provided with a roof 21 having an opening 22 therein and lid 23. The bin is filled through the opening 22 until the level of the grain 24 comes at least above the louvred cone and preferably to the top of the bin. Heated air is then passed to the plenum chamber 18 and auger 5 is switched on, so that drying and mixing takes place. The heated air passes through the apertures in the louvred cone 3 and through the layer of grain above the louvred cone. Due to the angle of repose of the grain an air space 25 is formed below the conical member 13 and most of the heated air passes to this space 25 and thence to the duct 12. At the lower part of the grain layer some of the heated air passes into the perforated tube 16 from which it passes into duct 12. The remainder of the air through the louvred cone passes generally upwards into and through the mass of grain in the bin with a portion of the air passing from the grain into duct 12 through perforations in the conical member 13. The air flow through the drier is indicated by the arrows in the drawing.

With the valve 10 closed the auger 5 lifts grain from the well 4 up through the auger tube 8 to a spreader 26 secured to the auger screw 7 just above the top of the auger flight, which spreader throws the elevated grain in an even curtain onto the top of the grain in the bin and in doing so causes the curtain to pass over the exhaust air from the top of duct 12 so that a large proportion of chaff, dross and dust is removed from the grain by aspiration and passes out through the opening 22 with the exhaust air.

Gradually the individual grains move down the bin and form part of the relatively thin layer passing over the louvres 3 where a substantial proportion of the drying takes place. The grain is thus subjected to drying and is then elevated for distribution and mixing with the grain on top of the bin so that even drying takes place. The space 25 and the relatively thin layer over the louvres results from the provision of cone 13 and the angle of repose of falling grain. This angle of repose is higher when the grain is wet so that the layer is at its thinnest when the grain is wettest and requires maximum drying. If the cone 13 is enlarged so that a thinner layer is provided it will be found that perforated cylinder 16 can be omitted without substantial loss in drying efficiently.

When it is desired to empty the bin the valve 10 is opened by means of rod 11 and the auger 5 then discharges the grain through outlet pipe 9.

Conveniently the bin is formed of a framework to which are secured a number of panels one or more of which are removable to gain access to the interior of the bin. Preferably a panel is removable in the area of the plenum chamber 18 to allow access thereto and also a section of the louvred cone towards the bottom is removable to enable the last remnants of grain to be removed when it is necessary to clean the drier out completely. When such panels are removable it may be convenient to transfer the drive motor 6 to the bottom of auger 5 and to provide an enclosed gear box to effect the drive therebetween.

The louvres may be formed of an assembly of separate slats or of punched metal in expanded form.

The grain drier shown in FIG. 2 is substantially rectangular in horizontal cross-section and the downwardly inclined part is formed by two main louvred surfaces 30-31 which form a V-trough 32 along the bottom of the bin. In the trough is a horizontal conveying worm 33 which delivers grain from the bottom of the inclined part to a vertical elevating conveyor 34 for distribution over the surface of the grain in the bin. Mounted parallel to the said louvred surfaces and extending from wall to wall in the bin is an inverted V-shaped skirt member 35 the lower extremities of which in conjunction with the inclined part of the bin define paths for the layers of grain descending over the louvred surfaces, and there being in communication with the space under the said skirt member an air-duct 36 leading to atmosphere. The spout 37 by which elevated grain from the upper part of the vertical conveyor 34 is distributed over the grain in the bin is capable of being swivelled so as to discharge dry grain to a position outside the bin.

A drier in accordance with the invention has the advantage that it can also be used as a storage bin and/or as a grain conditioner, the elevating means enabling the contents to be discharged as required.

What is claimed is:

1. A drier for grain as defined, comprising, a bin having a lower interior part downwardly inclined to form a plenum chamber therebelow which inclined part is provided with louvres which are inwardly and downwardly directed to allow passage of heated air from the plenum chamber to and through a layer of grain passing over the said inclined part, means having a delivery end for elevating the grain from the bottom of the inclined part and distributing it onto the surface of the grain in the bin, selectively operable discharging means associated with the delivery end of said elevating means whereby dried grain may be discharged from the bin, a downwardly flared perforated skirt-like member mounted within the bin so that its lower extremity in conjunction with the surface of the said inclined part defines a path for the layer of grain descending to the bottom of the said inclined part, and an air duct leading from the space under the said skirt-like member to atmosphere, characterised in that the said air duct communicates with atmosphere at all times and is an imperforate tube which passes vertically through the centre of the mass of grain in the bin and is co-axial with and has its bottom end supported by the upper part of the said skirt-like member and has its open upper end above the level of the said grain and below the means whereby elevated grain is distributed, the walls of the said tube being adapted to cause heat from the moistened heated air flowing in the said duct to be transferred to the mass of grain through which the tube passes without allowing any of the moistened heated air from the space under the skirt-like member to percolate into the said grain.

2. A drier as claimed in claim 1, wherein the means for elevating the grain from the bottom of the inclined part of the bin is a vertical conveyor arranged within the air duct leading from the space under the skirt-like member to atmosphere.

3. A drier as claimed in claim 2, wherein the vertical conveyor is an auger screw within a confining casing, and the distribution of the elevated grain leaving the upper end of the said casing is performed by a rotary spreading element carried by and rotating with the auger screw.

4. A drier as claimed in claim 3, wherein the casing of the screw is provided with a side branch at a point below the upper end, which side branch is downwardly inclined away from the auger screw casing and is provided with a control valve which when open enables the grain to be discharged from the bin.

5. A drier as claimed in claim 1, wherein the bin is provided with a roof having an opening substantially above the top of the said vertical air duct so that heated air flowing through the duct from the space under the skirt-like member to atmosphere is maintained in concentrated form in passing to the opening, and thereby aspirates the elevated grain during distribution.

References Cited

UNITED STATES PATENTS

| | | | |
|---|---|---|---|
| 2,509,175 | 5/1950 | Sohanin | 34—102 |
| 2,634,513 | 4/1953 | Ladd et al. | 34—102 |
| 2,766,534 | 10/1956 | Schaub et al. | 34—174 X |

FOREIGN PATENTS 11,946   5/1894   Great Britain.

FREDERICK L. MATTESON, JR., *Primary Examiner.*

A. D. HERRMANN, *Assistant Examiner.*